Figure 1:
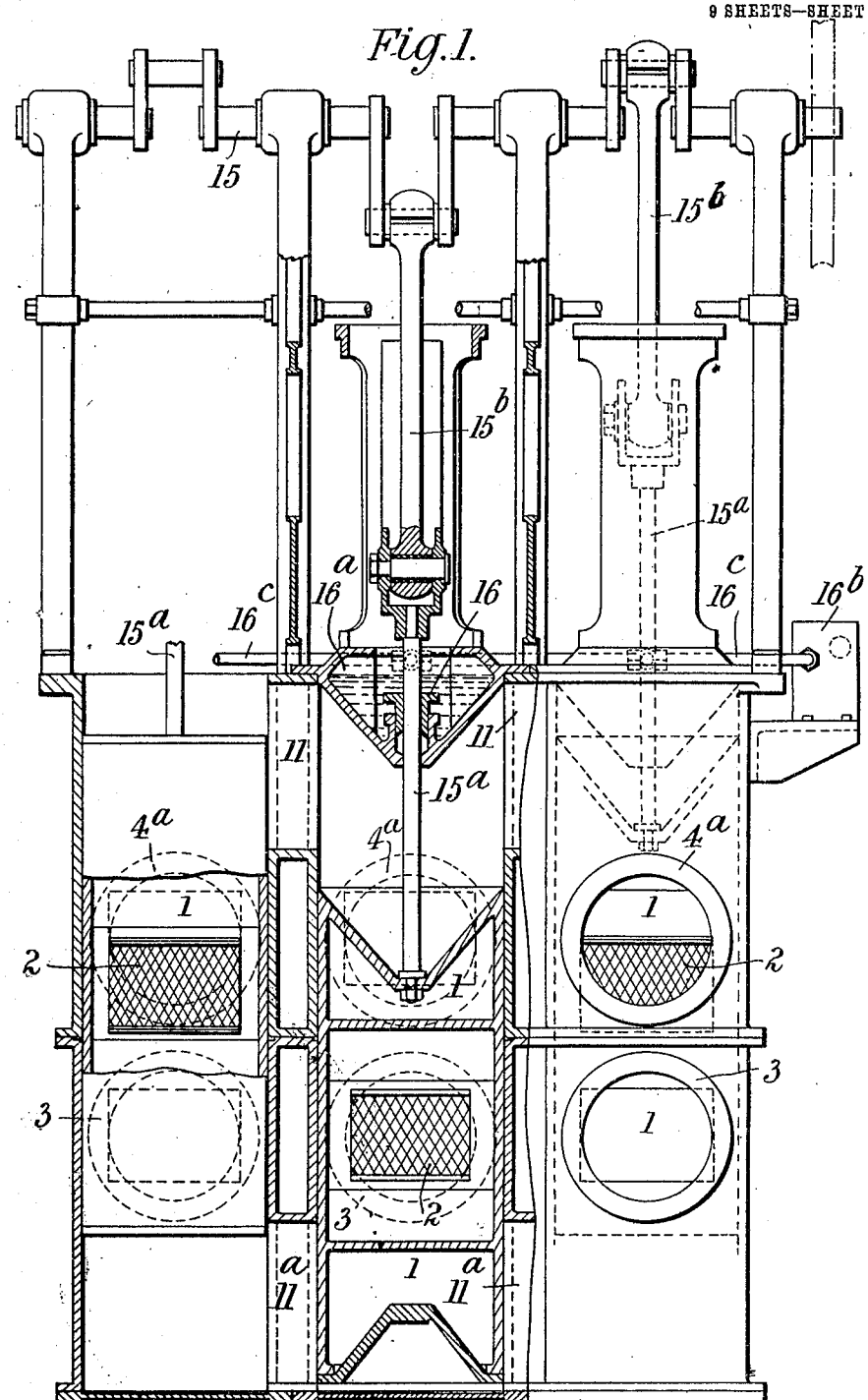
Figure 8:
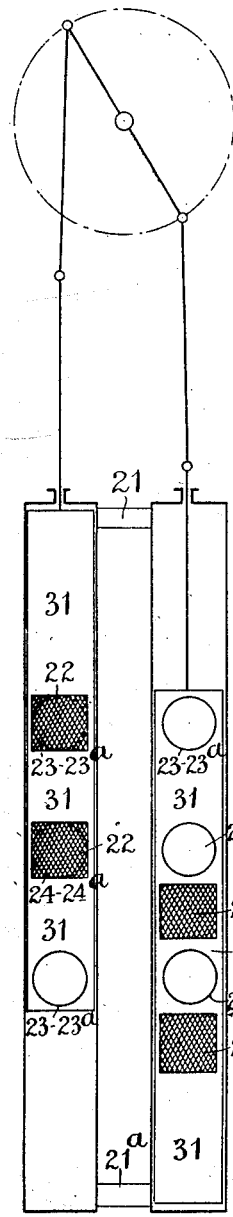

M. V. ROBERTS.
APPARATUS FOR STRAINING WATER AND THE LIKE.
APPLICATION FILED JUNE 29, 1908.
913,768.
Patented Mar. 2, 1909.
9 SHEETS—SHEET 2.
*Fig.2.*
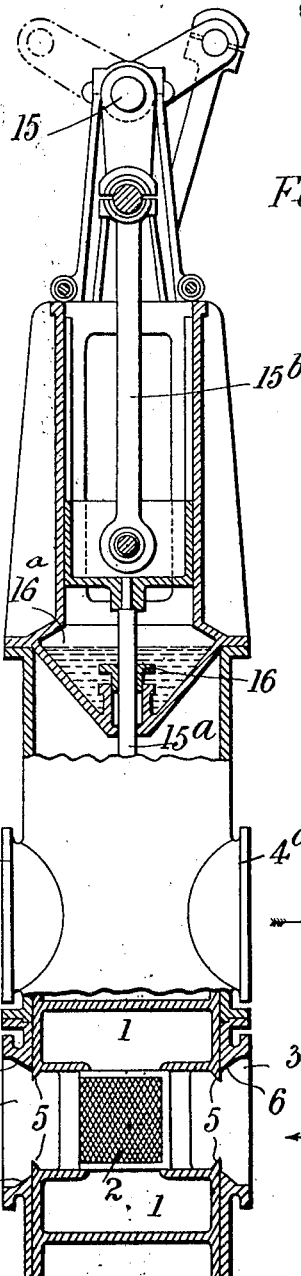
*Fig.3.*
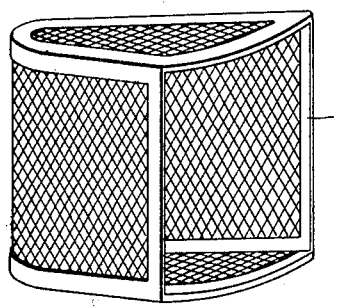
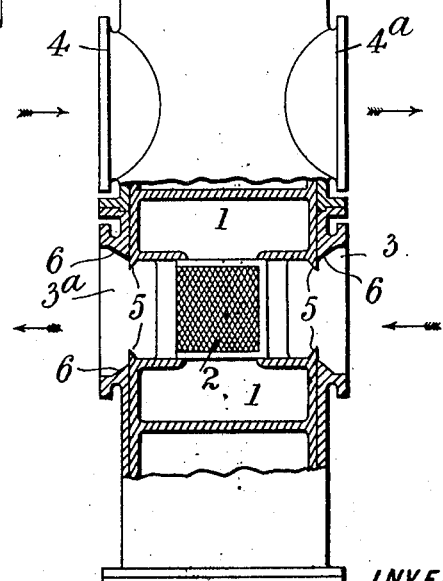
WITNESSES.
INVENTOR.

M. V. ROBERTS.
APPARATUS FOR STRAINING WATER AND THE LIKE.
APPLICATION FILED JUNE 29, 1908.
913,768.
Patented Mar. 2, 1909
9 SHEETS—SHEET 3
Fig. 4.
Fig. 5.
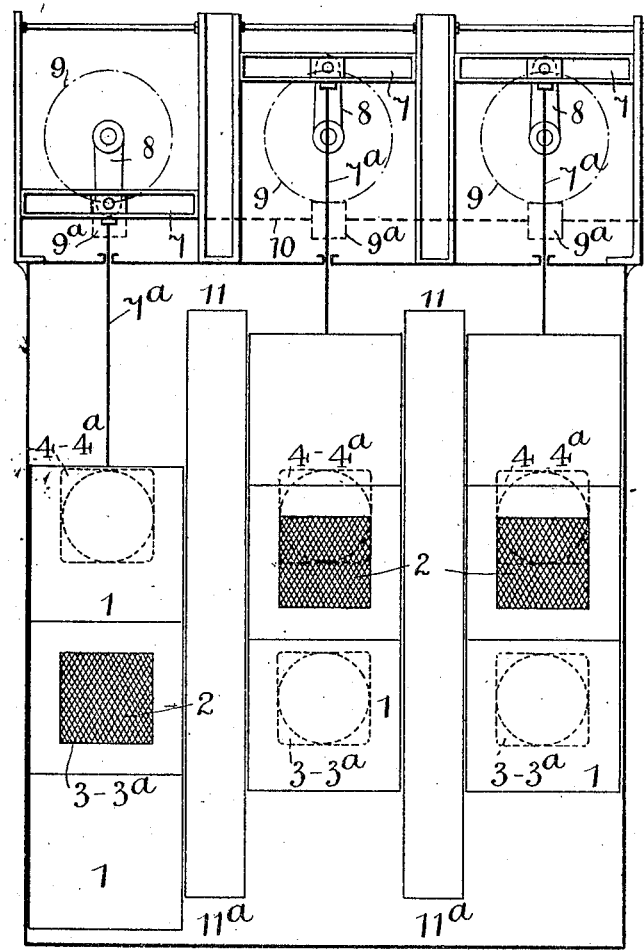
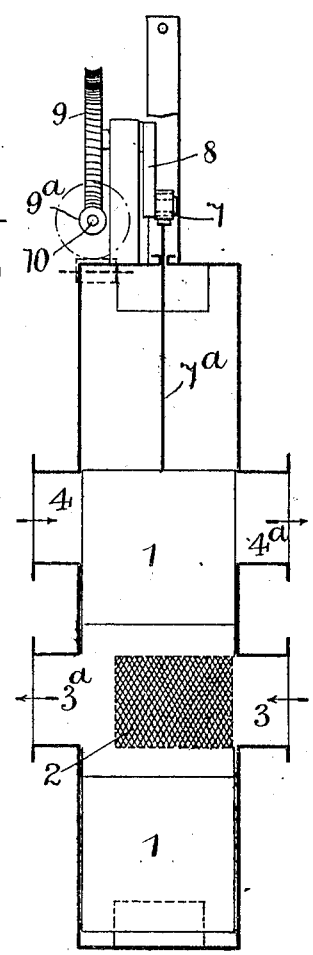
Witnesses.
J. J. McCarthy
B. C. Rust
Inventor.
M. V. Roberts
by Foster Freeman Watson + Cert
Attorneys M. V. ROBERTS.
APPARATUS FOR STRAINING WATER AND THE LIKE.
APPLICATION FILED JUNE 29, 1908.
913,768.
Patented Mar. 2, 1909.
9 SHEETS—SHEET 4.
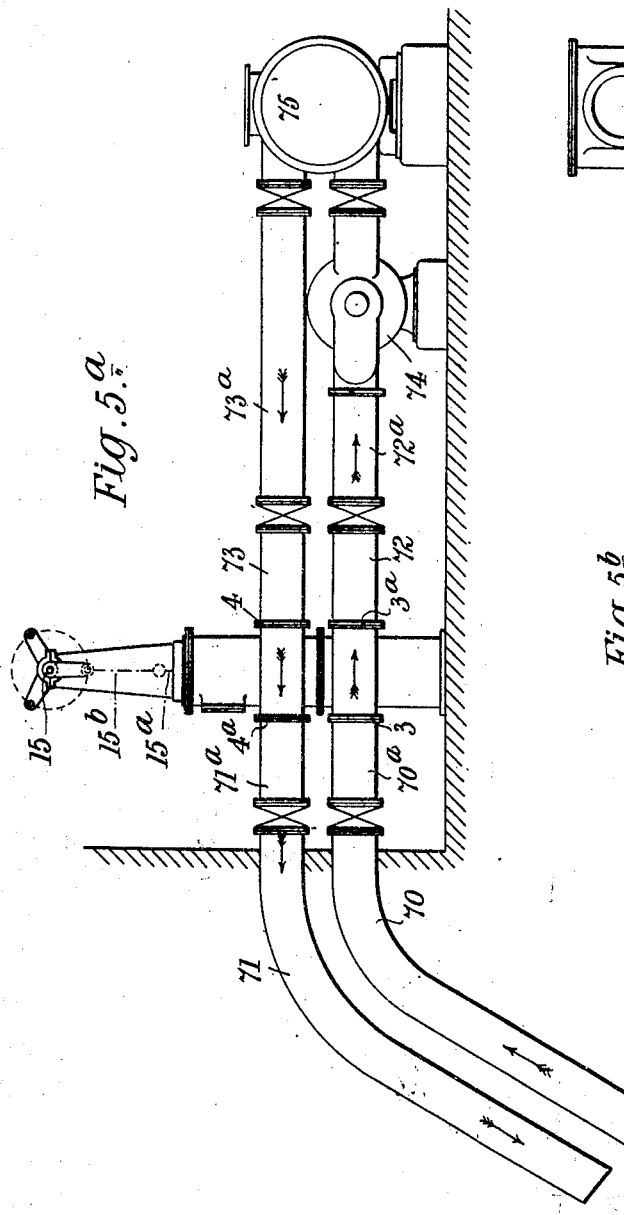
WITNESSES.
INVENTOR.

M. V. ROBERTS.
APPARATUS FOR STRAINING WATER AND THE LIKE.
APPLICATION FILED JUNE 29, 1908.
913,768.
Patented Mar. 2, 1909.
9 SHEETS—SHEET 5.
Fig. 6.
Fig. 7.
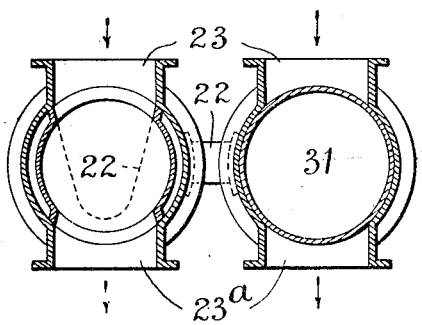
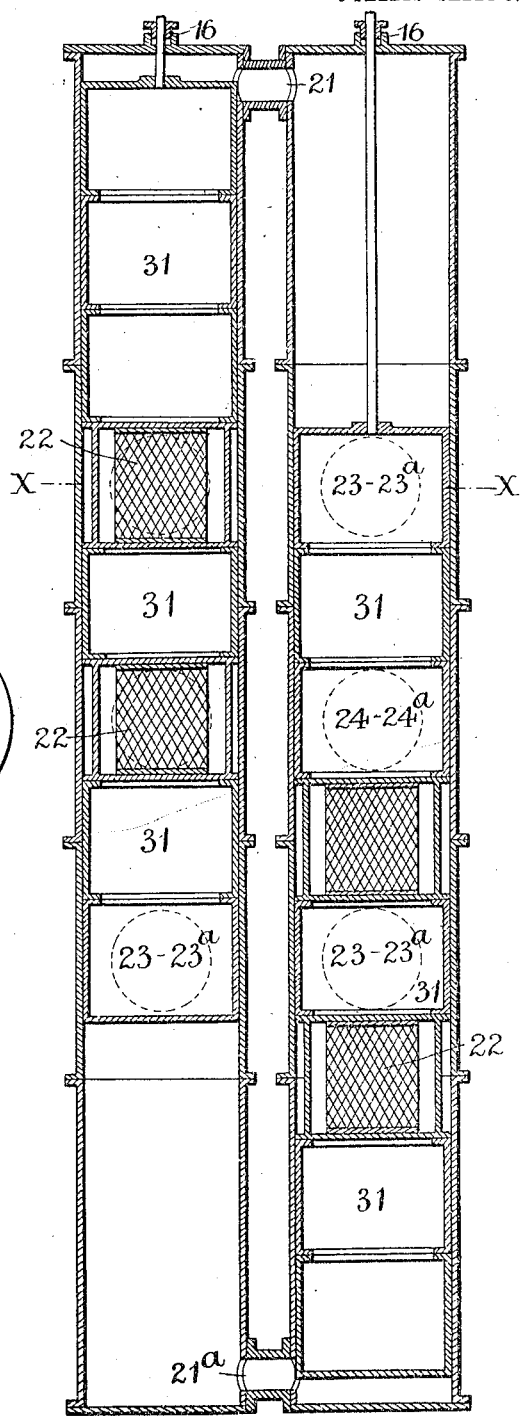
Witnesses.
Inventor.

M. V. ROBERTS.
APPARATUS FOR STRAINING WATER AND THE LIKE.
APPLICATION FILED JUNE 29, 1908.

913,768.

Patented Mar. 2, 1909.

Witnesses.

Inventor.

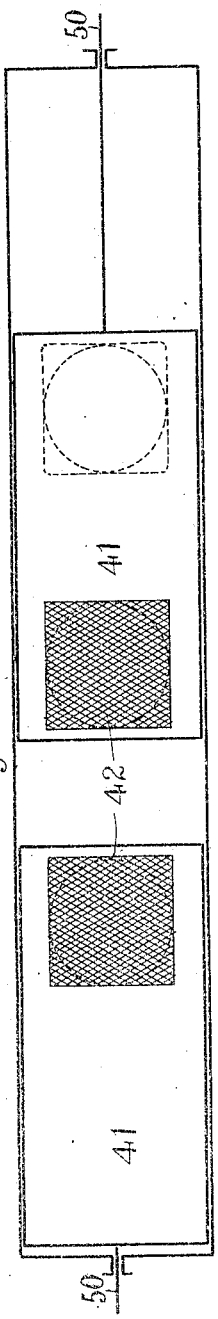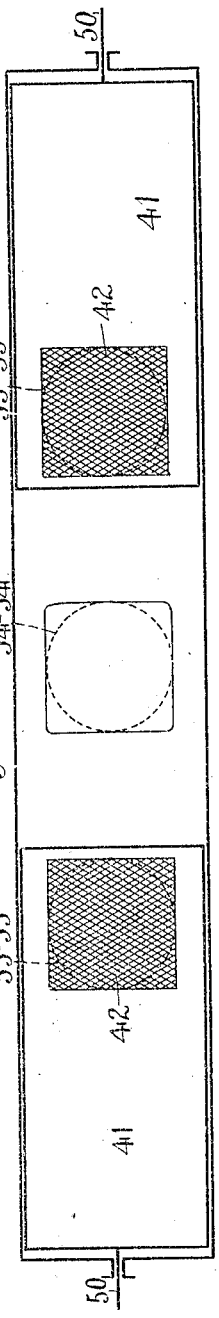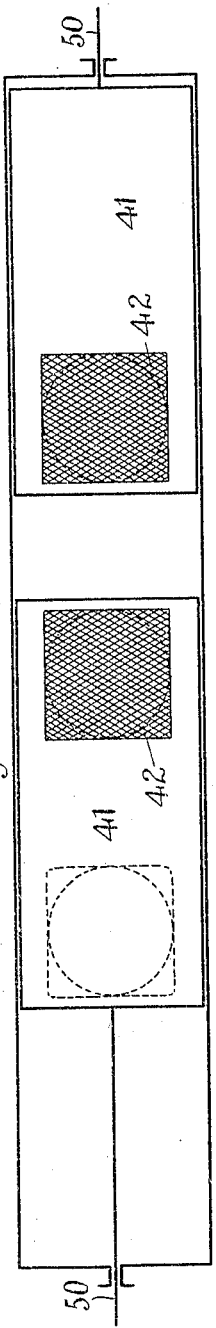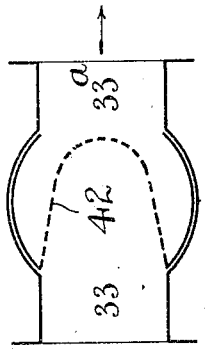

M. V. ROBERTS.
APPARATUS FOR STRAINING WATER AND THE LIKE.
APPLICATION FILED JUNE 29, 1908.

913,768.

Patented Mar. 2, 1909.
9 SHEETS—SHEET 8.

Witnesses.
J. J. McCarthy
B. C. Rust

Inventor.
M. V. Roberts
by Foster Freeman Watson & Co.
Attorneys

M. V. ROBERTS.
APPARATUS FOR STRAINING WATER AND THE LIKE.
APPLICATION FILED JUNE 29, 1908.

913,768.

Patented Mar. 2, 1909.
9 SHEETS—SHEET 9.

Witnesses.
J. J. McCarthy
B. C. Rust

Inventor.
M. V. Roberts
by Foster Freeman Watson Coit
Attorneys

UNITED STATES PATENT OFFICE.

MARTIN VALENTINE ROBERTS, OF EPSOM, ENGLAND.

APPARATUS FOR STRAINING WATER AND THE LIKE.

No. 913,768.

Specification of Letters Patent.

Patented March 2, 1909.

Application filed June 29, 1908. Serial No. 440,999.

*To all whom it may concern:*

Be it known that I, MARTIN VALENTINE ROBERTS, a subject of His Majesty the King of Great Britain, residing at Epsom, in the county of Surrey, England, have invented a certain new and useful Improved Apparatus for Straining Water and the Like, of which the following is a specification.

This invention relates to an improved apparatus for straining water and the like for use with steam condensers, or for other purposes.

The water used for condensing steam from steam engines, steam turbines and for other purposes when taken from a lake, river canal, or drain, frequently contains more or less material such as weeds, leaves, straw, pieces of cloth, hair, turnips, vegetable refuse, wood and other matter which if not arrested blocks the condenser tubes. Hitherto a fixed grid placed in the intake passage between the lake, river or the like, and the station has been used to strain the water before use, but disadvantages attend the use of such a grid, for instance, the difficulty of removing the accumulation from the lake or river side of the grid, the space the grid occupies and others.

The invention consists of an improved apparatus of the self-cleaning type which is automatic in its action in which the deposit of foreign matter left by the liquid on the strainer is washed off subsequently by the return flow, that is the water after it has been utilized is used for cleaning the strainer and carrying the accumulation back into the lake, river or other source of supply, for example when the water is used for a steam condenser the strainer removes all suspended material from the cold water before the latter enters the condenser and this material is removed from the strainer by the heated water from the condenser on its way back by the discharge passage to the source of supply.

It is particularly applicable in the cases where it is desired to balance the head of water in the suction pipe by the head of water in the discharge pipe, as in the case of stations taking water from a lake, river or the like, and working on what is known as the closed system for the circulating water, or it may be used in an open circulating system.

By a closed system is meant one in which if the water has to be lifted to a height, the work on the pumps is reduced by arranging the pipes in such a manner that the weight of the discharged water balances or nearly balances the weight of the intake. According to same the strainer grids are arranged to reciprocate either continuously or periodically as the strainers become foul, and for this purpose one or more are combined with a piston or pistons and are caused to move in a casing or cylinder to present themselves respectively to inlet and outlet passages.

Some forms of apparatus according to the invention are shown in the accompanying drawings in which:—

Figure 16:
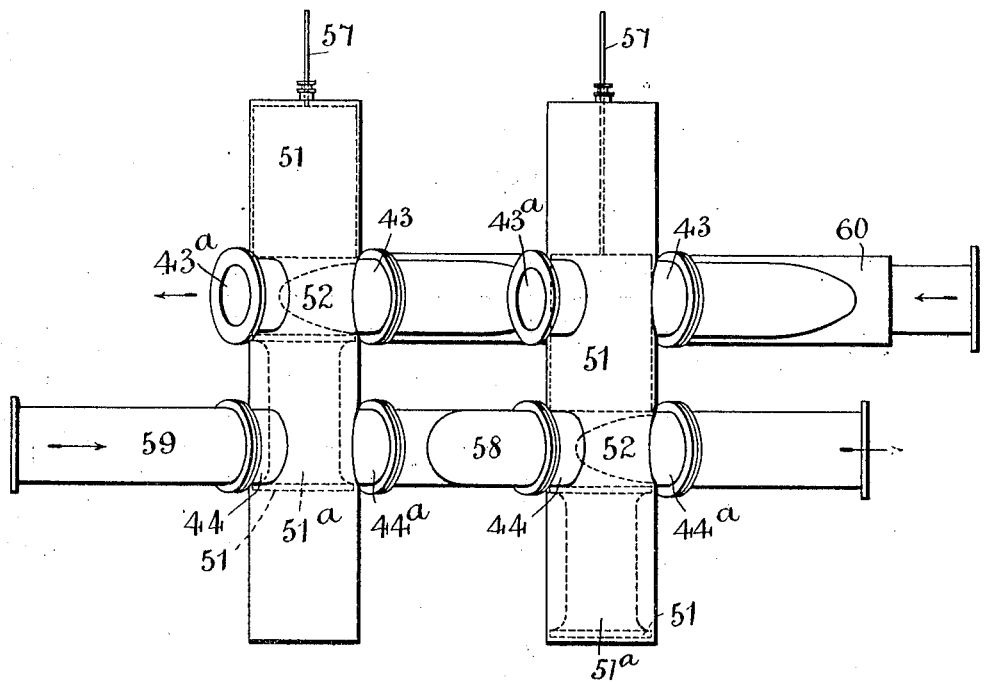
Figure 17:
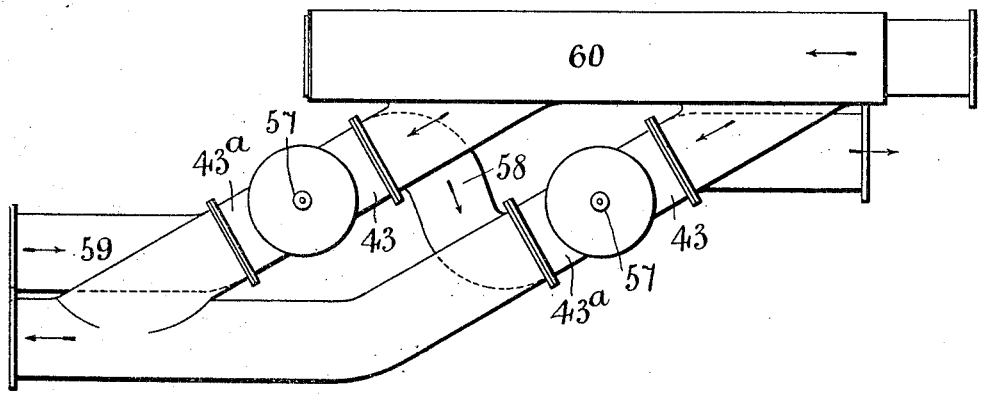
Figure 18:
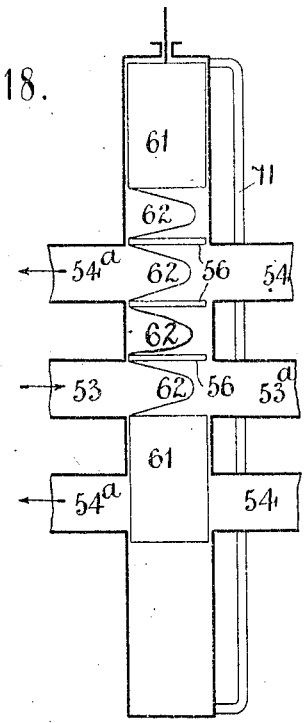
Figure 19:
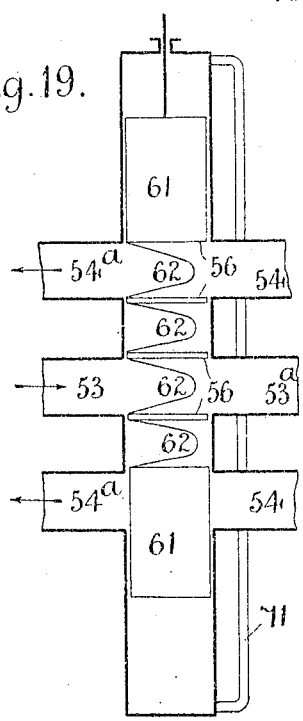

Figure 1 is a front view of a suitable general form of apparatus partly in section having three cylinders with one strainer in each. Fig. 2 is a side elevation also partly in section. Fig. 3 is a perspective view of a form of strainer on an enlarged scale. Fig. 4 is a diagrammatic view showing a similar arrangement of strainers as in Fig. 1 but with a modified driving gear. Fig. 5 is a diagrammatic view of Fig. 4 taken at a right angle to it. Fig. 5$^a$ is a general view or elevation showing the general arrangement of a three line apparatus as shown in Figs. 1 and 2 and in part in Figs. 4 and 5 in connection with a condenser and pump. Fig. 5$^b$ is a plan of same. Fig. 6 is a sectional elevation of two connected cylinders each having two strainers. Fig. 7 is a sectional plan of Fig. 6 on line X X. Figs. 8 to 11 are diagrammatic views representing different positions of the strainers of Figs. 6 and 7. Figs. 12 to 14 are diagrammatic views of a cylinder having two strainers, each one of which is independently reciprocated, the three views showing different positions of the strainers. Fig. 15 is a diagrammatic section of any of Figs. 12, 13 or 14 through one of the strainers and inlet and outlet. Fig. 16 is an elevation of a further arrangement of two cylinders each having a single strainer with their pipe connection which are partly removed. Fig. 17 is a plan of same. Figs. 18 to 21 are diagrammatic views of a cylinder having four strainers, the four views showing different positions of the strainers.

In these drawings like figures of reference represent like parts throughout.

It will be understood that in all forms of the invention hereinafter described, a strainer is presented to an inlet opening from the river or the like, the water is drawn through it leaving the foreign matter therein or thereon, and passes to an outlet opposite to such inlet from whence it goes to the condenser or the like. The strainer is then cleared or cleansed by an upward or downward lateral or other movement which may place it in front of an inlet receiving the used water from the condenser or the like which water passes through it in the reverse direction and then to an outlet from whence it passes to the discharge pipe. The parts are preferably duplicated to insure a continuous flow of water and except in Figs. 8 to 21 so arranged that as the ports of one are gradually opened to pass water, the ports in the other are gradually closed.

In Figs. 1 and 2 each of the three cylinders or chambers contains a piston which carries a strainer but inasmuch as a portion or portions of the piston is required both in the above and in the various forms hereinafter described for interposing before or between the inlets and outlets of the cylinders to form a valve or valves, the valve portion is marked 1 and will be hereinafter referred to as the "piston" while the strainer portion 2 will be referred to as the "strainer." The combined piston and strainer are in this case operated through piston rods 15$^a$ and connecting links 15$^b$ by a three throw crank shaft 15 which is a convenient motion for the purpose while the strainer 2 which may be formed as a cage with an opening on one side, is in this form made with a rounded back and a wide oblong opening as shown in Fig. 3 as this construction enables the height to be reduced in comparison with a circular one, thus lessening the throw of the crank, the cage or basket form being suitable for enabling foreign bodies left inside to be carried up or down in the reciprocating movement. Each cylinder is provided with an inlet 3 and outlet 3$^a$ for the intake water and an inlet 4 and outlet 4$^a$ for the discharge water. In this construction the cylinders are closed and the piston rods 15$^a$ are packed by suitable glands such as 16 in order that the apparatus may be employed in a closed circulating system. In addition if desired water may be kept supplied to a receptacle 16$^a$ around the piston rod, leakage being compensated for from a tank 16$^b$ supplied from a ball cock, which tank supplies the receptacle by pipes 16$^c$. For the purpose of slicing up or breaking bodies which are too large to go into the strainer cage the pistons 1 may be provided with knife edges 5 which coöperate with knife edges 6 on the inlet and outlet openings on the upward and downward movement of the piston. The three cylinders are open to each other at the top and bottom at 11 and 11$^a$ for equalizing purposes, or so that the contained water may pass from one to the other as the moving parts ascend and descend.

The arrangement shown may be termed a three line apparatus and is preferred, where it is desirable to reduce the height, to the two line form next hereinafter described consisting of two cylinders each containing two strainers and three pistons. Where it is still further desired to reduce the height other forms of driving gear may be employed, one being indicated in Figs. 4 and 5 which are diagrams showing the operation of the three line type of Figs. 1 and 2 and which consists of a slotted crosshead 7 to which the piston rod 7$^a$ is attached the slot of the crosshead carrying the pin of a crank 8, the rotation of which will give the usual reciprocating motion to the crosshead 7 and piston rod 7$^a$ without the intervention of the connecting rod shown in Figs. 1 and 2. In the case shown in Figs. 4 and 5 the cranks are all shown as being driven by worm wheels 9 from a suitably rotated shaft 10 through the intervention of worm wheels 9$^a$.

The operation of the apparatus shown in Figs. 1 and 2 is indicated in these diagrams Figs. 4 and 5 from which it will be seen that (referring to Fig. 4) the discharge openings 4—4$^a$ of the two right-hand cylinders are each half open to the strainers 2, 2 while the intake 3—3$^a$ of the left-hand cylinder is fully open, the positions being changed with the movement of the parts but always permitting of practically the same amount of strainer surface being exposed for the intake to strain the water and to the discharge to remove refuse from the inside of the strainer, either through one strainer or through two more or less fully open. In Fig. 1 the two outer cylinders have their strainers each half open to the discharge while the center strainer is fully open to the intake. It will be understood that all the inlet openings 3 are preferably connected to one general intake passage 70 Figs. 5$^a$, 5$^b$, and all the outlet openings 4$^a$ to one general discharge passage 71 by any suitable means. That shown consists of union connecting pieces 70$^a$ 71$^a$ respectively. On the other side of the apparatus all the openings 3$^a$ communicate with a union piece 72 and all the openings 4 with a union piece 73 each union communicating through pipes 72$^a$, 73$^a$ respectively with the pump 74 and condenser 75. Suitable valves as requirements determine are inserted in the pipes.

Figure 9:
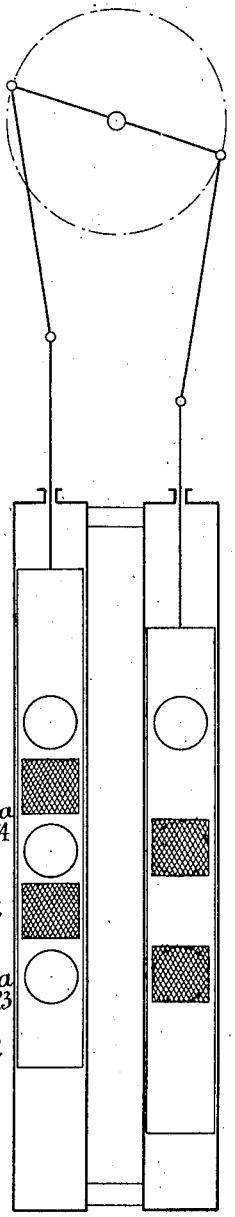
Figure 10:
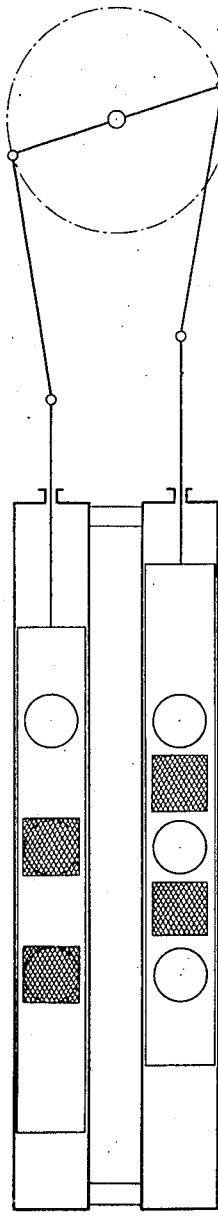
Figure 11:
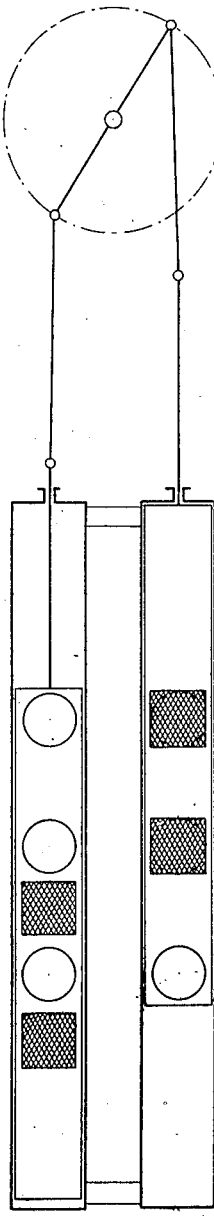

In Figs. 6 and 7 and the diagrams Figs. 8 to 11 there are two cylinders forming two lines having equalizing pipes 21, 21$^a$, (equivalent to the passages 11, 11$^a$ of the preceding figures) for the water displaced by the moving parts, connecting such cylinders at the top and bottom, and there are two inlets 23, 23 connected to an intake pipe and a single center outlet 24$^a$ connected to a discharge on one side of each cylinder, there being corresponding outlets 23$^a$ 23$^a$ and an inlet 24 on the opposite or condenser side of each, which will be connected respectively to that apparatus for supplying it with water and receiving its return flow. In each cylinder are two strainers 22, 22 and three pistons 31, 31, 31, the arrangement shown in Fig. 6 corresponding to the diagram Fig. 8 from which it will be seen that the left hand cylinder has two strainers 22 fully exposed to an intake inlet 23, and a discharge outlet 24 respectively, the other cylinder being closed. The other diagrams Figs. 9 to 11 show variations of these positions.

Figs. 12 to 14 show diagrammatically different positions of a single line apparatus being a cylinder having two strainers 42 and two pistons 41, but these are separated as shown, each piston and its strainer having its own piston rods 50, 50, which are separately reciprocated, the cylinder also having two inlets 33, 33 connected to an intake and a single center outlet 34$^a$ connected to a discharge on one side and corresponding outlets 33$^a$, 33$^a$ and an inlet 34 on the opposite or condenser side of each, connected respectively by pipes to that apparatus. Fig. 15 is a section of any one of these diagrams through one of the strainers and inlet and outlet. In this case the motion is intermittent and as will be seen by Fig. 13 the outlet 34 to the discharge has at times no strainer opposite to it to cleanse when there are two inlets 33, 33 open to the intake. In this arrangement only one line of strainers is required for a continuous service.

In Figs. 16 and 17 an apparatus is shown consisting of two cylinders having each one strainer 52 and two pistons 51, 51, with their piston rods 57. The lower piston in each case has a through way 51$^a$. The inlets 43, 43 to the intake are in parallel so that the stream from the intake trunk or pipe 60 may pass through either cylinder to the outlets 43$^a$ depending upon which cylinder has its strainer 52 opposite to an inlet opening. In Fig. 16 this is the left hand one the other being closed by the piston 51. The outlet is in series, that is, all the returning discharge water from the pipe 59 passes into the opening 44 of the left hand cylinder through the passage 51$^a$ of the piston through the outlet 44$^a$ then through a connecting pipe 58, the opening 44 of the other cylinder, through the reverse way of the strainer 52 in this cylinder, and to the outlet 44$^a$ so that such strainer may be cleansed. The intermittent motion given to the moving parts then reverses their positions, the intake water passing through the strainer of the right hand cylinder which has been moved to its raised position while the discharge passes through the strainer of the left hand cylinder which has been moved to its lower position.

Figure 20:
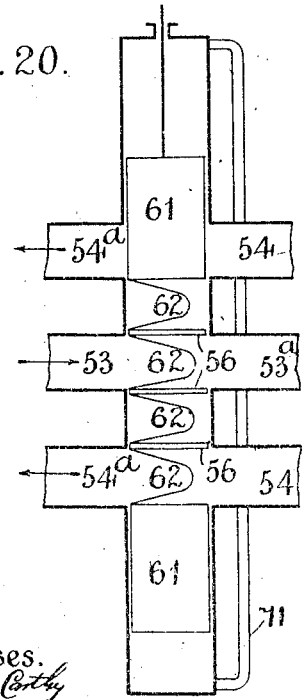
Figure 21:
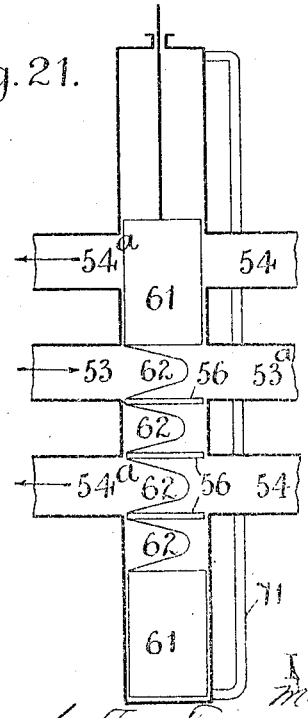

Figs. 18 to 21 show a single line apparatus with a continuous motion. In this case there are four strainers 62, 62, 62, 62, in each cylinder separated only by walls or diaphragms 56 with pistons 61 at each end, the upper and lower ends of the cylinders being connected by an equalizing pipe 71 for any water moved by the parts. Each cylinder has further on one side an inlet 53 and two outlets 54$^a$, and on the other an outlet 53$^a$ for the intake and two inlets 54, 54, for the discharge. The position of the parts shown in Fig. 18 does not make any difference in effect (except that different strainers are in operation) over that shown in Fig. 19 where the piston has moved down the space of one strainer but with a further and similar movement as shown in Fig. 20 a piston 61 has closed the upper passage from 54 to 54$^a$ of the discharge and the lowest passage 54 to 54$^a$ also to the discharge, has been opened in place thereof. The central passage 53 to 53$^a$ always remains open through a strainer.

It will be seen that all the forms of apparatus are simple and that the mixing of the water is guarded against and that owing to the reciprocating movement and the fact that the strainers are in basket or like form they only have to be elevated or lowered or otherwise moved to place the refuse or foreign matter in front of the point where they will be washed out.

Several forms of apparatus have been shown but it should be understood that other variations are possible and may be convenient. For instance the chambers may be in other forms than cylinders and the strainers be receptacles of other shape than that shown.

What I claim is:—

1. In apparatus for straining, a strainer, and means for reciprocating same to place it alternately in the intake and discharge of a circulating system.

2. In apparatus for straining, a strainer of basket form, adapted to catch refuse in the inward flow of a circulating system and to carry such refuse in its movement in front of the outward flow of said system, to release same and means for reciprocating such strainer to obtain said movement.

3. In apparatus for straining, a strainer, a piston forming a valve, means for reciprocating both of same and a chamber in which said strainer and valve work, such chamber having intake and discharge openings, before which the strainer and valve are alternately placed by the movement imparted to them.

4. In apparatus for straining, a series of strainers, a series of pistons forming valves, alternating with said strainers, means for reciprocating all of said strainers and valves, and a chamber in which said strainers and valves work, such chamber having a series of intake and discharge openings before which the strainers and valves are alternately placed by the movement imparted to them.

5. In apparatus for straining, a strainer, a piston forming a valve, means for reciprocating both of same, and a closed cylinder in which said strainer and valve work, such cylinder having intake and discharge openings before which the strainer and valve are alternately placed by the movement imparted to them.

6. In apparatus for straining, a strainer, a piston forming a valve, means for reciprocating both of same, a cutting edge carried by said valve, a chamber for said piston and valve, having intake and discharge openings and a cutting edge on the chamber adapted to co-act with the edge on the valve to cut up refuse.

7. In apparatus for straining, a chamber having a plurality of corresponding inlet and outlet openings, one of each in conjunction, being adapted to pass a body of liquid directly through such chamber, a piston in said chamber, a strainer forming part of said piston, and means for reciprocating said piston, to place the piston portion and the strainer portion alternately between each of such corresponding openings.

8. In apparatus for straining, a cylinder having a plurality of corresponding inlet and outlet openings, one of each in conjunction, being adapted to pass a body of liquid directly through such cylinder, a piston in said cylinder, a basket shaped strainer carried by said piston, a piston rod for said piston and a gland on the cylinder for packing said rod and means for reciprocating said rod to place the piston portion and the strainer portion alternately between each of such corresponding openings.

9. In apparatus for straining, a cylinder, a reciprocating strainer therein, a piston rod for operating said strainer, a receptacle around said piston rod and a water supply connected thereto for sealing said piston rod.

10. In apparatus for straining, three cylinders, each having a plurality of inlet and outlet openings, adapted to pass bodies of liquid directly through such cylinders, a piston and a strainer in each member, and means for reciprocating each piston and strainer to so position them in front of the openings that the same amount of strainer surface is exposed to the intake to strain, and to the discharge to remove refuse from the other face of the strainer.

In testimony whereof I have hereunto set my hand in the presence of two subscribing witnesses.

MARTIN VALENTINE ROBERTS.

Witnesses:
ERNEST PARKER,
ETHEL M. WEBB.